United States Patent
Liu

(10) Patent No.: US 10,356,744 B2
(45) Date of Patent: Jul. 16, 2019

(54) NODE LOCALIZATION METHOD AND DEVICE

(71) Applicant: HUAWEI TECHNOLOGIES CO., LTD., Shenzhen (CN)

(72) Inventor: Yongjun Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/959,289

(22) Filed: Apr. 23, 2018

(65) Prior Publication Data
US 2018/0242274 A1 Aug. 23, 2018

Related U.S. Application Data

(63) Continuation of application No. PCT/CN2016/102730, filed on Oct. 20, 2016.

(30) Foreign Application Priority Data

Oct. 23, 2015 (CN) .......................... 2015 1 0697509

(51) Int. Cl.
*G01S 5/02* (2010.01)
*H04B 7/06* (2006.01)
(Continued)

(52) U.S. Cl.
CPC ............. *H04W 64/003* (2013.01); *G01S 5/02* (2013.01); *G01S 5/0252* (2013.01);
(Continued)

(58) Field of Classification Search
CPC ........ G01S 5/02; G01S 13/751; G01S 13/878; G01Q 10/087; H04W 64/00; H04W 24/10; H01Q 3/26; H01Q 3/26
See application file for complete search history.

(56) References Cited

U.S. PATENT DOCUMENTS 8,738,024 B1 5/2014 Kerr et al.
2005/0246334 A1 11/2005 Tao et al.
(Continued)

FOREIGN PATENT DOCUMENTS

CN 1951027 A 4/2007
CN 101216546 A 7/2008
(Continued)

OTHER PUBLICATIONS

Translation of CN101424737.*
(Continued)

*Primary Examiner* — Nizar N Sivji
(74) *Attorney, Agent, or Firm* — Kilpatrick Townsend & Stockton, LLP

(57) ABSTRACT

A node localization method and device are disclosed. The method includes: determining a first set of radio signal measurement values that can be received by each known-location node of at least one known-location node, and determining a second set of radio signal measurement values that can be received by a to-be-localized node; determining, according to the radio signal measurement values included in the first set that respectively correspond to each known-location node and the radio signal measurement values included in the second set, a weighting coefficient corresponding to each known-location node (101); and determining location information of the to-be-localized node according to the weighting coefficient corresponding to each known-location node and location information of each known-location node (102).

16 Claims, 4 Drawing Sheets

(51) Int. Cl.
    *H04W 24/10* (2009.01)
    *H04W 64/00* (2009.01)
(52) U.S. Cl.
    CPC .......... *G01S 5/0284* (2013.01); *H04W 24/10* (2013.01); *H04B 7/0626* (2013.01)

(56) References Cited

U.S. PATENT DOCUMENTS

| | | | |
|---|---|---|---|
| 2007/0132577 | A1 | 6/2007 | Kolavennu |
| 2012/0302252 | A1 | 11/2012 | Alles et al. |
| 2013/0027249 | A1 | 1/2013 | Schantz et al. |
| 2014/0062792 | A1 | 3/2014 | Schantz et al. |
| 2014/0226503 | A1 | 8/2014 | Cooper et al. |

FOREIGN PATENT DOCUMENTS

| | | |
|---|---|---|
| CN | 101236244 A | 8/2008 |
| CN | 101424737 A | 5/2009 |
| CN | 102833848 A | 12/2012 |
| CN | 103038662 A | 4/2013 |
| CN | 103402258 A | 11/2013 |
| CN | 103874191 A | 6/2014 |
| CN | 104507164 A | 4/2015 |
| EP | 1853082 A2 | 11/2007 |
| EP | 1969386 A2 | 9/2008 |

OTHER PUBLICATIONS

Wang Huanhuan et al., Algorithm of Centroid Localization Based on the RSSI Difference Weighting. Bulletin of Science and Technology, vol. 30 No. 9, Sep. 2014, 6 pages.

Ke-Ting Lee et al., Femto-Assisted Location Estimation in Macro/Femto Heterogeneous Networks. Wireless Communications and Networking Conference (WCNC), 2013 IEEE, Jul. 15, 2013, 6 pages.

* cited by examiner

NODE LOCALIZATION METHOD AND DEVICE

CROSS-REFERENCE TO RELATED APPLICATIONS

This application is a continuation of International Application No. PCT/CN2016/102730, filed on Oct. 20, 2016, which claims priority to Chinese Patent Application No. 201510697509.0, filed on Oct. 23, 2015, The disclosures of the aforementioned applications are hereby incorporated by reference in their entireties.

TECHNICAL FIELD

The present invention relates to the field of wireless communications technologies, and in particular, to a node localization method and device.

BACKGROUND

In a wireless communications network, node localization is a very important technology and application, and accurate localization can bring great value.

In the prior art, a location of a to-be-localized node is usually determined by measuring a status of a plurality of radio signals received at a known location. For example, for performing localization based on a fingerprint matching algorithm, first, a status of a plurality of radio signals received at a large quantity of known locations is measured in a to-be-localized area, and for each known location, location information of the known location and a status of a received radio signal are used as a fingerprint and input into a database. Subsequently, matching is performed between a status of a plurality of radio signals received by a to-be-localized node and fingerprints in the database. A fingerprint with a status similar to the status of the radio signals received by the to-be-localized node is selected from the fingerprints in the database. Location information corresponding to the selected fingerprint with the status similar to the status of the radio signals received by the to-be-localized node is used as a location of the to-be-localized node. Localization accuracy of such a node localization manner depends on a size of the fingerprint database. Usually, to increase localization accuracy by twice, the size of the fingerprint database needs to increase by four times or eight times. In addition, a status of the radio signals changes because the radio signals are easily affected by environmental signals. Therefore, the database needs to be updated frequently; otherwise, the localization accuracy greatly decreases.

In conclusion, currently, in a manner of performing localization by using a known-location node, a status of radio signals received at a large quantity of known locations needs to be measured in a case of ensuring localization accuracy, resulting in relatively heavy measurement workload of node localization in the prior art.

SUMMARY

Embodiments of the present invention provide a node localization method and device, to resolve a problem of relatively heavy measurement workload of node localization in the prior art.

According to a first aspect, a node localization method is provided, including:

determining a first set of radio signal measurement values that can be received by each known-location node of at least one known-location node, and determining a second set of radio signal measurement values that can be received by a to-be-localized node, where the radio signal measurement values included in the first set that are received by each known-location node and the radio signal measurement values included in the second set are respectively determined according to a radio signal sent by at least one common node;

determining, according to the radio signal measurement values included in the first set that respectively correspond to each known-location node and the radio signal measurement values included in the second set, a weighting coefficient corresponding to each known-location node; and determining location information of the to-be-localized node according to the weighting coefficient corresponding to each known-location node and location information of each known-location node.

With reference to the first aspect, in a first possible implementation of the first aspect, the radio signal measurement value is a radio signal strength value; and the determined weighting coefficient corresponding to each known-location node meets a requirement of the following formula:

$$a_i = \frac{\sum_{k=1}^{N} 10^{-\frac{|P_{ki}-P_k|}{10n_i}}}{\sum_{i=1}^{M}\sum_{k=1}^{N} 10^{-\frac{|P_{ki}-P_k|}{10n_i}}},$$

where $P_k$ is a radio signal strength value of a radio signal that is sent by the $k^{th}$ common node and that is received by the to-be-localized node, $p_{ki}$ is a radio signal strength value of the radio signal that is sent by the $k^{th}$ common node and that is received by the $i^{th}$ known-location node, $a_i$ is a weighting coefficient corresponding to the $i^{th}$ known-location node, N is a quantity of common nodes, M is a quantity of known-location nodes, and $n_i$ is a large-scale channel fading index corresponding to the $i^{th}$ known-location node.

With reference to the first aspect, in a second possible implementation of the first aspect, a result that is obtained by performing, by using the weighting coefficient corresponding to each known-location node, weighted summation on the radio signal measurement values that are included in the first set corresponding to each known-location node and that are determined according to a radio signal sent by a same node approximates the radio signal measurement values that are included in the second set and that are determined according to the radio signal sent by the same node.

With reference to the second possible implementation of the first aspect, in a third possible implementation of the first aspect, the radio signal measurement value is a radio signal strength value; and the determined weighting coefficient corresponding to each known-location node meets a requirement of the following formula:

$$\begin{cases} \sum_{i=1}^{M} a_i = 1 \\ f_{min}(a_1, a_2, a_3, \ldots, a_M) = \sum_{k=1}^{N}\left(P_k - \sum_{k=1}^{M} a_i * p_{ki}\right)^2 \end{cases},$$

where $P_k$ is a radio signal strength value of a radio signal that is sent by the $k^{th}$ common node and that is received by the to-be-localized node, $p_{ki}$ is a radio signal strength value of the radio signal that is sent by the $k^{th}$ common node and that is received by the $i^{th}$ known-location node, $a_i$ is a weighting coefficient corresponding to the $i^{th}$ known-location node, N is a quantity of common nodes, M is a quantity of known-location nodes, and $f_{min}(a_1, a_2, a_3, \ldots, a_M)$ represents a value when $P_k$ most closely approximates $$\sum_{i=1}^{M} a_i * p_{ki},$$

where k=1, 2, ..., N.

With reference to the second possible implementation of the first aspect, in a fourth possible implementation of the first aspect, the radio signal measurement value is a radio signal strength value; and the determined weighting coefficient corresponding to each known-location node meets a requirement of the following formula:

$$\begin{cases} \sum_{i=1}^{M} a_i = 1 \\ g_{min}(a_1, a_2, a_3, \ldots, a_M) = \sum_{k=1}^{N}\left(P_k - \sum_{k=1}^{M} a_i * P_{ki}\right)^2 + \lambda\left(\sum_{i=1}^{M} a_i - 1\right) \end{cases},$$

where $P_k$ is a radio signal strength value of a radio signal that is sent by the $k^{th}$ common node and that is received by the to-be-localized node, $p_{ki}$ is a radio signal strength value of the radio signal that is sent by the $k^{th}$ common node and that is received by the $i^{th}$ known-location node, $a_i$ is a weighting coefficient corresponding to the $i^{th}$ known-location node, N is a quantity of common nodes, M is a quantity of known-location nodes, $g_{min}(a_1, a_2, a_3, \ldots, a_M)$ represents a value when $P_k$ most closely approximates $$\sum_{i=1}^{M} a_i * p_{ki},$$

where k=1, 2, ..., N, and λ is a Lagrange coefficient.

With reference to the second possible implementation of the first aspect, in a fifth possible implementation of the first aspect, the radio signal measurement value is a subchannel frequency domain response amplitude squared value in channel state information CSI; and the determined weighting coefficient corresponding to each known-location node meets a requirement of the following formula:

$$\begin{cases} \sum_{i=1}^{M} a_i = 1 \\ w_{min}(a_1, a_2, a_3, \ldots, a_M) = \sum_{h=1}^{C}\sum_{k=1}^{N}\left(P_{kh} - \sum_{i=1}^{M} a_i * p_{ki,h}\right)^2 \end{cases},$$

where $P_{kh}$ is the $h^{th}$ subchannel frequency domain response amplitude squared value between the to-be-localized node and the $k^{th}$ common node, $p_{ki,h}$ is the $h^{th}$ subchannel frequency domain response amplitude squared value between the $i^{th}$ known-location node and the $k^{th}$ common node, $a_i$ is a weighting coefficient corresponding to the $i^{th}$ known-location node, N is a quantity of common nodes, M is a quantity of known-location nodes, c is a quantity of common subchannels between the to-be-localized node and the $k^{th}$ common node and between the $i^{th}$ known-location node and the $k^{th}$ common node, and $w_{min}(a_1, a_2, a_3, \ldots, a_M)$ represents a value when $P_{kh}$ most closely approximates $$\sum_{i=1}^{M} a_i * p_{ki,h}.$$

With reference to the second possible implementation of the first aspect, in a sixth possible implementation of the first aspect, the radio signal measurement value is a subchannel frequency domain response amplitude squared value in channel state information CSI; and the determined weighting coefficient corresponding to each known-location node meets a requirement of the following formula:

$$\begin{cases} \sum_{i=1}^{M} a_i = 1 \\ v_{min}(a_1, a_2, \ldots, a_M) = \sum_{h=1}^{C}\sum_{k=1}^{N}\left(P_{kh} - \sum_{i=1}^{M} a_i * P_{ki,h}\right)^2 + \lambda\left(\sum_{i=1}^{M} a_i - 1\right) \end{cases},$$

where $P_{kh}$ is the $h^{th}$ subchannel frequency domain response amplitude squared value between the to-be-localized node and the $k^{th}$ common node, $p_{ki,h}$ is the $h^{th}$ subchannel frequency domain response amplitude squared value between the $i^{th}$ known-location node and the $k^{th}$ common node, $a_i$ is a weighting coefficient corresponding to the $i^{th}$ known-location node, N is a quantity of common nodes, M is a quantity of known-location nodes, c is a quantity of common subchannels between the to-be-localized node and the $k^{th}$ common node and between the $i^{th}$ known-location node and the $k^{th}$ common node, $v_{min}(a_1, a_2, a_3, \ldots, a_M)$ represents a value when $P_{kh}$ most closely approximates $$\sum_{i=1}^{M} a_i * p_{ki,h},$$

and λ is a Lagrange coefficient.

With reference to any one of the first aspect to the sixth possible implementation of the first aspect, in a seventh possible implementation of the first aspect, the determined location information of the to-be-localized node meets a requirement of the following formula:

$$(x, y, z) = \sum_{i=1}^{N} a_i(x_i, y_i, z_i),$$

where (x,y,z) is coordinate location information of the to-be-localized node, $(x_i,y_i,z_i)$ is coordinate location information of the $i^{th}$ known-location node, and $a_i$ is the weighting coefficient corresponding to the $i^{th}$ known-location node.

According to a second aspect, a node localization method is provided, including:

for the $i^{th}$ known-location node in M known-location nodes, determining a first set $\{p_{1i}, \ldots, p_{Ni}\}$ of radio signal measurement values that is determined by the $i^{th}$ known-location node according to received radio signals sent by N common nodes, and determining a second set $\{p_1, \ldots, p_j, \ldots, p_N\}$ of radio signal measurement values that is determined by a to-be-localized node according to received radio signals sent by the N common nodes, where i, M, and N are positive integers;

for the $i^{th}$ known-location node in the M known-location nodes, determining a set $\{\Delta p_{1i}, \ldots, \Delta p_{Ni}\}$ of differences between the first set $\{p_{1i}, \ldots, p_{Ni}\}$ corresponding to the $i^{th}$ known-location node and the second set $\{p_1, \ldots, p_N\}$, where $\Delta p_{1i} = p_{1i} - p_1, \ldots, \Delta p_{Ni} = p_{Ni} - p_1$; and determining, in preset localization space, location information of the to-be-localized node according to M determined difference sets, where the determined location information of the to-be-localized node meets a requirement of the following formula:

$$P = f(x,y,z) | \{\Delta p_{11}, \ldots \Delta p_{N1}\}; \ldots \{\ldots, \Delta p_{ki}, \ldots\}, \{\Delta p_{1M} \ldots \Delta p_{NM}\}),$$

where f( ) is a constructed joint probability density function, (x,y,z) is coordinate location information of the to-be-localized node, and P is a maximum value of the probability density function.

According to a third aspect, a node localization device is provided, including:

a first determining module, configured to: determine a first set of radio signal measurement values that can be received by each known-location node of at least one known-location node, and determine a second set of radio signal measurement values that can be received by a to-be-localized node, where the radio signal measurement values included in the first set that are received by each known-location node and the radio signal measurement values included in the second set are respectively determined according to a radio signal sent by at least one common node;

a first processing module, configured to determine, according to the radio signal measurement values included in the first set that respectively correspond to each known-location node and the radio signal measurement values included in the second set, a weighting coefficient corresponding to each known-location node; and a first localization module, configured to determine location information of the to-be-localized node according to the weighting coefficient corresponding to each known-location node and location information of each known-location node.

With reference to the third aspect, in a first possible implementation of the third aspect, the radio signal measurement value is a radio signal strength value, and the first processing module is specifically configured to:

determine that the weighting coefficient corresponding to each known-location node meets a requirement of the following formula:

$$a_i = \frac{\sum_{k=1}^{N} 10^{-\frac{|P_{ki}-P_k|}{10n_i}}}{\sum_{i=1}^{M}\sum_{k=1}^{N} 10^{-\frac{|P_{ki}-P_k|}{10n_i}}},$$

where $P_k$ is a radio signal strength value of a radio signal that is sent by the $k^{th}$ common node and that is received by the to-be-localized node, $p_{ki}$ is a radio signal strength value of the radio signal that is sent by the $k^{th}$ common node and that is received by the $i^{th}$ known-location node, $a_i$ is a weighting coefficient corresponding to the $i^{th}$ known-location node, N is a quantity of common nodes, M is a quantity of known-location nodes, and $n_i$ is a large-scale channel fading index corresponding to the $i^{th}$ known-location node.

With reference to the third aspect, in a second possible implementation of the third aspect, a result that is obtained by the first processing module by performing, by using the weighting coefficient corresponding to each known-location node, weighted summation on the radio signal measurement values that are included in the first set corresponding to each known-location node and that are determined according to a radio signal sent by a same node approximates the radio signal measurement values that are included in the second set and that are determined according to the radio signal sent by the same node.

With reference to the second possible implementation of the third aspect, in a fourth possible implementation of the third aspect, the radio signal measurement value is a radio signal strength value, and the first processing module is specifically configured to:

determine that the weighting coefficient corresponding to each known-location node meets a requirement of the following formula:

$$\begin{cases} \sum_{i=1}^{M} a_i = 1 \\ f_{min}(a_1, a_2, a_3, \ldots, a_M) = \sum_{k=1}^{N}\left(P_k - \sum_{i=1}^{M} a_i * p_{ki}\right)^2 \end{cases},$$

where $P_k$ is a radio signal strength value of a radio signal that is sent by the $k^{th}$ common node and that is received by the to-be-localized node, $p_{ki}$ is a radio signal strength value of the radio signal that is sent by the $k^{th}$ common node and that is received by the $i^{th}$ known-location node, $a_i$ is a weighting coefficient corresponding to the $i^{th}$ known-location node, N is a quantity of common nodes, M is a quantity of known-location nodes, and $f_{min}(a_1, a_2, a_3, \ldots, a_M)$ represents a value when $P_k$ most closely approximates $$\sum_{i=1}^{M} a_i * p_{ki},$$

where k=1, 2, . . . , N.

With reference to the second possible implementation of the third aspect, in a fifth possible implementation of the third aspect, the radio signal measurement value is a radio signal strength value, and the first processing module is specifically configured to:

determine that the weighting coefficient corresponding to each known-location node meets a requirement of the following formula:

$$\begin{cases} \sum_{i=1}^{M} a_i = 1 \\ g_{min}(a_1, a_2, \ldots, a_M) = \sum_{k=1}^{N}\left(P_k - \sum_{i=1}^{M} a_i * P_{ki}\right)^2 + \lambda\left(\sum_{i=1}^{M} a_i - 1\right) \end{cases},$$

where $P_k$ is a radio signal strength value of a radio signal that is sent by the $k^{th}$ common node and that is received by the to-be-localized node, $p_{ki}$ is a radio signal strength value of the radio signal that is sent by the $k^{th}$ common node and that is received by the $i^{th}$ known-location node, $a_i$ is a weighting coefficient corresponding to the $i^{th}$ known-location node, N is a quantity of common nodes, M is a quantity of known-location nodes, $g_{min}(a_1, a_2, a_3, \ldots, a_M)$ represents a value when $P_k$ most closely approximates $$\sum_{i=1}^{M} a_i * p_{ki},$$

where k=1, 2, . . . , N, and λ is a Lagrange coefficient.

With reference to the second possible implementation of the third aspect, in a sixth possible implementation of the third aspect, the radio signal measurement value is a subchannel frequency domain response amplitude squared value in channel state information CSI, and the first processing module is specifically configured to:

determine that the weighting coefficient corresponding to each known-location node meets a requirement of the following formula:

$$\begin{cases} \sum_{i=1}^{M} a_i = 1 \\ w_{min}(a_1, a_2, a_3, \ldots, a_M) = \sum_{h=1}^{C}\sum_{k=1}^{N}\left(P_{kh} - \sum_{i=1}^{M} a_i * p_{ki,h}\right)^2 \end{cases},$$

where $P_{kh}$ is the $h^{th}$ subchannel frequency domain response amplitude squared value between the to-be-localized node and the $k^{th}$ common node, $p_{ki,h}$ is the $h^{th}$ subchannel frequency domain response amplitude squared value between the $i^{th}$ known-location node and the $k^{th}$ common node, $a_i$ is a weighting coefficient corresponding to the $i^{th}$ known-location node, N is a quantity of common nodes, M is a quantity of known-location nodes, c is a quantity of common subchannels between the to-be-localized node and the $k^{th}$ common node and between the $i^{th}$ known-location node and the $k^{th}$ common node, and $w_{min}(a_1, a_2, a_3, \ldots, a_M)$ represents a value when $P_{kh}$ most closely approximates $$\sum_{i=1}^{M} a_i * p_{ki,h}.$$

With reference to the second possible implementation of the third aspect, in a seventh possible implementation of the third aspect, the radio signal measurement value is a subchannel frequency domain response amplitude squared value in channel state information CSI, and the first processing module is specifically configured to:

determine that the weighting coefficient corresponding to each known-location node meets a requirement of the following formula:

$$\begin{cases} \sum_{i=1}^{M} a_i = 1 \\ v_{min}(a_1, a_2, \ldots, a_M) = \sum_{h=1}^{C}\sum_{k=1}^{N}\left(P_{kh} - \sum_{i=1}^{M} a_i * P_{ki,h}\right)^2 + \lambda\left(\sum_{i=1}^{M} a_i - 1\right) \end{cases},$$

where $P_{kh}$ is the $h^{th}$ subchannel frequency domain response amplitude squared value between the to-be-localized node and the $k^{th}$ common node, $p_{ki,h}$ is the $h^{th}$ subchannel frequency domain response amplitude squared value between the $i^{th}$ known-location node and the $k^{th}$ common node, $a_i$ is a weighting coefficient corresponding to the $i^{th}$ known-location node, N is a quantity of common nodes, M is a quantity of known-location nodes, c is a quantity of common subchannels between the to-be-localized node and the $k^{th}$ common node and between the $i^{th}$ known-location node and the $k^{th}$ common node, $v_{min}(a_1, a_2, a_3, \ldots, a_M)$ represents a value when $P_{kh}$ most closely approximates $$\sum_{i=1}^{M} a_i * p_{ki,h},$$

and λ is a Lagrange coefficient.

With reference to any one of the third aspect to the seventh possible implementation of the third aspect, in an eighth possible implementation of the third aspect, the location information of the to-be-localized node that is determined by the first localization module meets a requirement of the following formula:

$$(x, y, z) = \sum_{i=1}^{N} a_i(x_i, y_i, z_i),$$

where (x,y,z) is coordinate location information of the to-be-localized node, $(x_i, y_i, z_i)$ is coordinate location information of the $i^{th}$ known-location node, and $a_i$ is the weighting coefficient corresponding to the $i^{th}$ known-location node.

According to a fourth aspect, a node localization device is provided, including:

a second determining module, configured to: for the $i^{th}$ known-location node in M known-location nodes, determine a first set $\{p_{1i}, \ldots, p_{Ni}\}$ of radio signal measurement values that is determined by the $i^{th}$ known-location node according to received radio signals sent by N common nodes, and determine a second set $\{p_1, \ldots, p_j, \ldots, p_N\}$ of radio signal measurement values that is determined by a to-be-localized node according to received radio signals sent by the N common nodes, where i, M, and N are positive integers;

a second processing module, configured to: for the $i^{th}$ known-location node in the M known-location nodes, determine a set $\{\Delta p_{1i}, \ldots, \Delta p_{Ni}\}$ of differences between the first set $\{p_{1i}, \ldots, p_{Ni}\}$ corresponding to the $i^{th}$ known-location node and the second set $\{p_1, \ldots, p_N\}$, where $\Delta p_{1i}=p_{1i}-p_1, \ldots, \Delta p_{Ni}=p_{Ni}-p_1$; and a second localization module, configured to determine, in preset localization space, location information of the to-be-localized node according to M determined difference sets, where the determined location information of the to-be-localized node meets a requirement of the following formula:

$$P=f(x,y,z)|\{\Delta p_{11}, \ldots \Delta p_{N1}\}; \ldots \{\ldots, \Delta p_{ki}, \ldots\}, \{\Delta p_{1M} \ldots \Delta p_{NM}\}),$$

where f( ) is a constructed joint probability density function, (x,y,z) is coordinate location information of the to-be-localized node, and P is a maximum value of the probability density function.

In the embodiments of the present invention, the location of the to-be-localized node is determined according to the weighting coefficient corresponding to each known-location node, or the location of the to-be-localized node in the localization space is determined by using the constructed joint probability density function. Therefore, a status of radio signals received at a large quantity of known locations does not need to be measured, and this improves measurement efficiency and accuracy of localizing a to-be-localized node compared with a method in the prior art for determining a location of a to-be-localized node.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention provide a node localization method and device, to resolve a problem of relatively heavy measurement workload of node localization in the prior art. The method and the device are based on a same inventive concept. Because problem-resolving principles for the method and the device are similar, implementations of the device and the method can be cross-referenced. No repeated description is provided.

A large-scale model of a radio signal is:

$$P=P_0-10n*lg(d/d_0)+X,$$

where $P_0$ is received signal strength when a distance is $d_0$, n is a large-scale channel fading index, d is a distance between a receiving device and a signal source, and x is a random variable. Because a received signal is usually changeable, the received signal may be indicated by using a Gaussian random variable. An average value of x is 0, and a mean square error of x is σ. According to many existing measurement results, n mostly ranges from 1.5 to 4, and σ mostly ranges from 3 to 15. Approximately, it is considered that P and a location are in a linear relationship, and the location may be estimated by means of linear interpolation.

The following further describes the embodiments of the present invention in detail with reference to the accompanying drawings of this specification.

Figure 1:
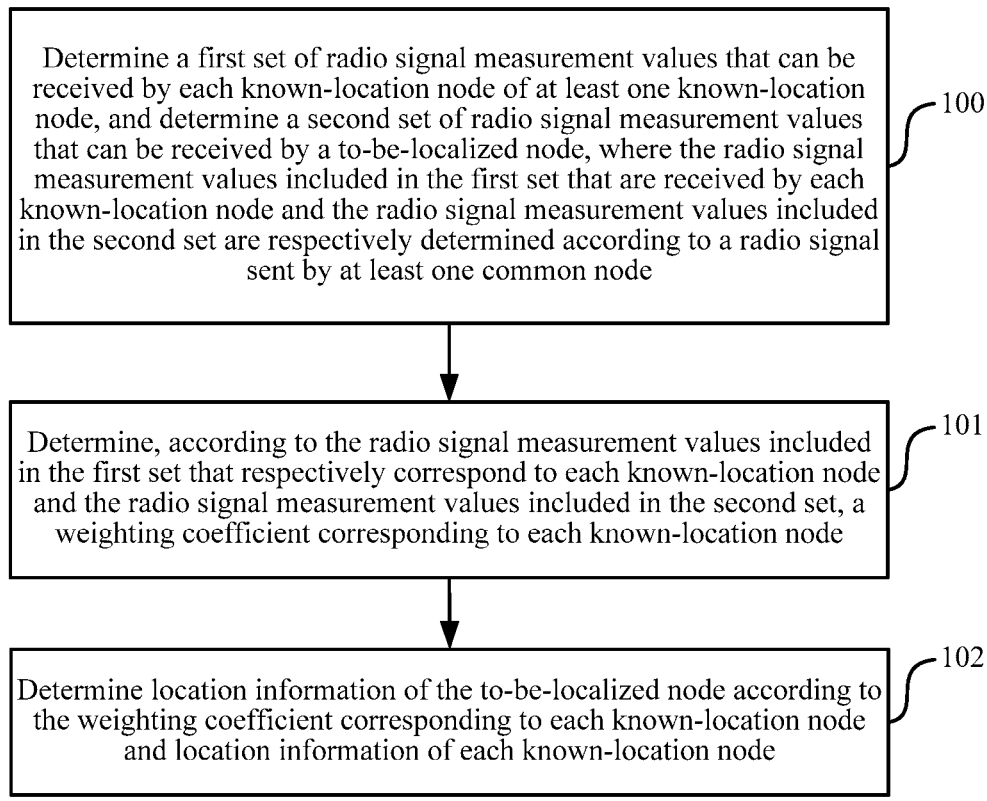
FIG. 1 is a flowchart of a node localization method according to an embodiment of the present invention.

As shown in FIG. 1, a node localization method of an embodiment of the present invention includes the following steps.

Step 100. Determine a first set of radio signal measurement values that can be received by each known-location node of at least one known-location node, and determine a second set of radio signal measurement values that can be received by a to-be-localized node, where the radio signal measurement values included in the first set that are received by each known-location node and the radio signal measurement values included in the second set are respectively determined according to a radio signal sent by at least one common node.

Step 101. Determine, according to the radio signal measurement values included in the first set that respectively correspond to each known-location node and the radio signal measurement values included in the second set, a weighting coefficient corresponding to each known-location node.

Step 102. Determine location information of the to-be-localized node according to the weighting coefficient corresponding to each known-location node and location information of each known-location node.

This embodiment of the present invention may be performed by a server that is independent of the to-be-localized node and the known-location node and that can be used for localization, or may be performed by the to-be-localized node. When this embodiment is performed by a server used for localization, the server may be a device that is a logical unit for completing only location calculation, or may be a server device having a logical location calculation function. A set of radio signal measurement values obtained by means of scanning by the to-be-localized node and a set of radio signal measurement values obtained by means of scanning by the known-location node are obtained in a wired or wireless communication manner.

Figure 2:
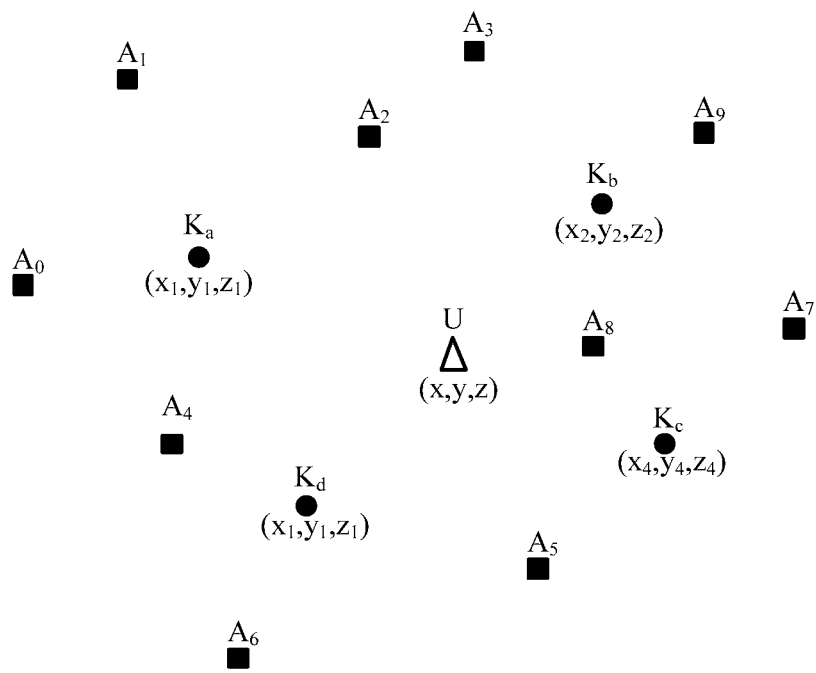
FIG. 2 is a schematic diagram of a node localization scenario according to an embodiment of the present invention.

The known-location node, the common node, the first set, and the second set are specifically described by using a scenario in FIG. 2 as an example.

There is a to-be-localized node U, known-location nodes $K_a$, $K_b$, $K_c$, and $K_d$, and unknown-location nodes $A_0$, $A_1$, $A_2$, $A_3$, $A_4$, $A_5$, $A_6$, $A_7$, $A_8$, and $A_9$. The to-be-localized node U can actually receive radio signals sent by the known-location nodes $K_b$, $K_c$, and $K_d$ and the unknown-location nodes $A_5$ and $A_8$, to obtain a set $\{P_b, P_c, P_d, P_5, P_8\}$ of measurement values of the received radio signals obtained by the to-be-localized node U. $P_b$ is a radio signal measurement value that is determined by the to-be-localized node U according to a received radio signal sent by the known-location node $K_b$. By analogy, $P_c$ is a radio signal measurement value that is determined by the to-be-localized node U according to a received radio signal sent by the known-location node $K_c$, $P_d$ is a radio signal measurement value that is determined by the to-be-localized node U according to a received radio signal sent by the known-location node $K_d$, $P_5$ is a radio signal measurement value that is determined by the to-be-localized node U according to a received radio signal sent by the unknown-location node $A_5$, and $P_8$ is a radio signal measurement value that is determined by the to-be-localized node U according to the received radio signal sent by the unknown-location node $A_8$. The known-location node $K_a$ can actually receive radio signals sent by the known-location node $K_b$ and the unknown-location nodes $A_0$, $A_1$, $A_2$, and $A_4$, to obtain a set $\{P_{ba}, P_{0a}, P_{1a}, P_{2a}, P_{4a}\}$ of measurement values of the received radio signals obtained by the known-location node $K_a$. $P_{ba}$ is a radio signal measurement value that is determined by the known-location node $K_a$ according to a received radio signal sent by the known-location node $K_b$, by analogy, $P_{0a}$ is a radio signal measurement value that is determined by the known-location node $K_a$ according to a received radio signal sent by the unknown-location node $A_0$, $P_{1a}$ is a radio signal measurement value that is determined by the known-location node $K_a$ according to a received radio signal sent from the unknown-location node $A_1$, $P_5$ is a radio signal measurement value that is determined by the to-be-localized node U according to a received radio signal sent by the unknown-location node $A_5$, and $P_8$ is a radio signal measurement value that is determined by the to-be-localized node U according to the received radio signal sent by the unknown-location node $A_8$. Similarly, if the known-location node $K_b$ can actually receive radio signals sent by the known-location node $K_a$ and the unknown-location nodes $A_2$, $A_3$, $A_8$, and $A_9$, a set of measurement values of the received radio signals obtained by the known-location node $K_b$ is $\{P_{ab}, P_{2b}, P_{3b}, P_{8b}, P_{9b}\}$. If the known-location node $K_c$ can actually receive radio signals sent by the unknown-location nodes $A_5$, $A_7$, and $A_8$, a set of measurement values of the received radio signals obtained by the known-location node $K_c$ is $\{P_{5e}, P_{7c}, P_{8c}\}$. If the known-location node $K_d$ can actually receive radio signals sent by the unknown-location nodes $A_4$, $A_5$, and $A_6$, a set of measurement values of the received radio signals obtained by the known-location node $K_d$ is $\{_{4d}, P_{5d}, P_{6d}\}$.

Optionally, a method for determining a first set and a second set of radio signal measurement values that can be received by the known-location nodes $K_a$, $K_b$, $K_c$, and $K_d$ includes: obtaining a union set of nodes corresponding to radio signals that can be received by each of the to-be-localized node U or the known-location nodes $K_a$, $K_b$, $K_c$, and $K_d$, to obtain common nodes $\{K_a, K_b, K_c, K_d, A_0, A_1, A_2, A_3, A_4, A_5, A_6, A_7, A_8, A_9\}$. Using the known-location node $K_a$ as an example, the known-location node $K_a$ can actually receive radio signals sent by the known-location node $K_b$ and the unknown-location nodes $A_0$, $A_1$, $A_2$, and $A_4$, but cannot receive radio signals sent by the known-location nodes $K_a$, $K_c$, and $K_d$ and the unknown-location nodes $A_3$, $A_5$, $A_6$, $A_7$, $A_8$, and $A_9$. Therefore, $P_{ba}$, $P_{0a}$, $P_{1a}$, $P_{2a}$, and $P_{4a}$ that are obtained through actual measurement are used as radio signal measurement values in the first set. $P_{aa}$, $P_{3a}$, $P_{5a}$, $P_{6a}$, $P_{7a}$, $P_{8a}$, and $P_{9a}$ are determined according to a preset rule. Usually, a node does not receive a radio signal sent by the node itself. In this embodiment of the present invention, a radio signal measurement value that is sent and received by a same node may be set to a value slightly less than transmit power of the node, for example, −10 dBm, and a radio signal measurement value between the node and a node that does not receive the sent radio signal is set to a value less than sensitivity of a receiver, for example, −100 dBm. The determining method for the second set is similar to that for the first set. Details are not described herein again.

Optionally, the method for determining the first set and the second set may further be as follows: A node that sends a radio signal that can be received by both the known-location node and the to-be-localized node is used as a common node. Assuming that all of the known-location nodes $K_a$, $K_b$, $K_c$, and $K_d$ and the to-be-localized node U can receive radio signals sent by the unknown-location nodes $A_0$, $A_1$, $A_2$, and $A_3$, the unknown-location nodes $A_0$, $A_1$, $A_2$, and $A_3$ are used as common nodes, and radio signal measurement values, obtained through actual measurement, of the radio signals that are sent by the unknown-location nodes $A_0$, $A_1$, $A_2$, and $A_3$ and that are received by the to-be-localized node U and the known-location nodes $K_a$, $K_b$, $K_c$, and $K_d$ are separately used as the radio signal measurement values in the first set and the second set.

Optionally, before the common nodes are determined, a radio signal measurement value not less than a preset threshold may be selected from actually received radio signal measurement values, and a node that transmits a radio signal and that corresponds to the selected radio signal measurement value is determined.

Specifically, if the preset threshold is −90 dBm, and $P_b$ is −75 dBm, the known-location node $K_b$ is used as a common node. If $P_1$ is −95 dBm, and $P_d$ is −85 dBm, the unknown-location node $A_1$ is used as a common node. Therefore, the node may be used as a common node provided that the to-be-localized node U and the known-location nodes $K_a$, $K_b$, $K_c$, and $K_d$ receive a radio signal sent by the node, and one of determined radio signal measurement values is not less than the preset threshold.

Optionally, because of variability of the radio signal, before the common node is determined, weighted averaging processing is performed on a currently received radio signal measurement value and a previously received radio signal measurement value.

Specifically, assuming that a radio signal measurement value that is currently determined by the to-be-localized node U according to a received radio signal sent by the known-location node $K_a$ is $P_a$=−72 dBm, and a radio signal measurement value that is previously determined by the to-be-localized node U according to a received radio signal sent by the known-location node $K_a$ is $P_a$=−80 dBm, the radio signal measurement value in the first set is determined according to the following formula:

$$P = \alpha * P_{n-1} + (1-\alpha) P_n,$$

where P is a determined radio signal measurement value in the first set, $P_{n-1}$, is a previous radio signal measurement value of a node, $P_n$ is a current radio signal measurement value, and α is a preset coefficient.

Assuming α=0.5, the determined radio signal measurement value that is in the first set and that is determined by the to-be-localized node U according to the received radio signal sent by the known-location node $K_a$ is −76 dBm.

In addition, there is further a radio signal that can be currently received by the to-be-localized node and that is sent by the unknown-location node $A_0$. For a radio signal that is sent by $A_0$ and that is not received previously, the current radio signal measurement value may be used as a radio signal measurement value in the first set, or the unknown-location node $A_0$ may be removed.

It should be noted that the known-location node may be a preset known-location node, or may be a known-location node whose sent radio signal can be received by the to-be-localized node, or may be a known-location node whose sent radio signal can be received by the to-be-localized node and another known-location node whose sent radio signal can be received by the known-location node.

Figure 3:
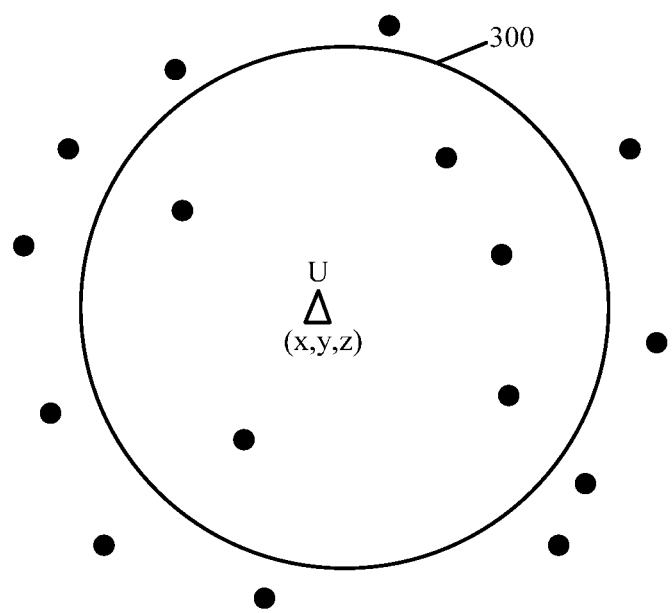
FIG. 3 is a schematic diagram of a node localization scenario according to an embodiment of the present invention.

As shown in FIG. 3, a radio signal sent by a known-location node in an area 300 can be received by a to-be-localized node, and a radio signal sent by a known-location node out of the area 300 cannot be received by the to-be-localized node but can be received by the known-location node in the area 300. The known-location node includes the known-location node in the area 300 and the known-location node that is out of the area 300 and whose sent radio signal can be received by the known-location node in the area 300, or the known-location node includes only the known-location node in the area 300.

In this embodiment of the present invention, for determining the weighting coefficient corresponding to each known-location node, the following optional methods are included:

Method 1: In a weighted centroid method, the radio signal measurement value is a radio signal strength value; and the determined weighting coefficient corresponding to each known-location node meets a requirement of the following formula:

$$a_i = \frac{\sum_{k=1}^{N} 10^{-\frac{|P_{ki}-P_k|}{10n_i}}}{\sum_{i=1}^{M}\sum_{k=1}^{N} 10^{-\frac{|P_{ki}-P_k|}{10n_i}}},$$

where $P_k$ is a radio signal strength value of a radio signal that is sent by the $k^{th}$ common node and that is received by the to-be-localized node, $p_{ki}$ is a radio signal strength value of the radio signal that is sent by the $k^{th}$ common node and that is received by the $i^{th}$ known-location node, $a_i$ is a weighting coefficient corresponding to the $i^{th}$ known-location node, N is a quantity of common nodes, M is a quantity of known-location nodes, and $n_i$ is a large-scale channel fading index corresponding to the $i^{th}$ known-location node.

It should be noted that in terms of a value of $n_i$, for different known-location nodes, a same large-scale channel fading index may be used or different large-scale channel fading indexes may be used. This parameter may be obtained through measurement during deployment of the known-location nodes.

Optionally, a result that is obtained by performing, by using the weighting to coefficient corresponding to each known-location node, weighted summation on the radio signal measurement values that are included in the first set corresponding to each known-location node and that are determined according to a radio signal sent by a same node approximates the radio signal measurement values that are included in the second set and that are determined according to the radio signal sent by the same node.

Method 2: The radio signal measurement value is a radio signal strength value; and the determined weighting coefficient corresponding to each known-location node meets a requirement of the following formula:

$$\begin{cases} \sum_{i=1}^{M} a_i = 1 \\ f_{min}(a_1, a_2, a_3, \ldots, a_M) = \sum_{k=1}^{N}\left(P_k - \sum_{i=1}^{M} a_i * p_{ki}\right)^2 \end{cases},$$

where $P_k$ is a radio signal strength value of a radio signal that is sent by the $k^{th}$ common node and that is received by the to-be-localized node, $p_{ki}$ is a radio signal strength value of the radio signal that is sent by the $k^{th}$ common node and that is received by the $i^{th}$ known-location node, $a_i$ is a weighting coefficient corresponding to the $i^{th}$ known-location node, N is a quantity of common nodes, M is a quantity of known-location nodes, and $f_{min}(a_1, a_2, a_3, \ldots, a_M)$ represents a value when $P_k$ most closely approximates $$\sum_{i=1}^{M} a_i * p_{ki},$$

where k=1, 2, ..., N.

It should be noted that $$f_{min}(a_1, a_2, a_3, \ldots, a_M) = \sum_{k=1}^{N}\left(P_k - \sum_{i=1}^{M} a_i * p_{ki}\right)^2$$

is constructed according to a minimum mean square error criterion.

Method 3: The radio signal measurement value is a radio signal strength value; and the determined weighting coefficient corresponding to each known-location node meets a requirement of the following formula:

$$\begin{cases} \sum_{i=1}^{M} a_i = 1 \\ g_{min}(a_1, a_2, \ldots, a_M) = \sum_{k=1}^{N}\left(P_k - \sum_{i=1}^{M} a_i * P_{ki}\right)^2 + \lambda\left(\sum_{i=1}^{M} a_i - 1\right) \end{cases},$$

where $P_k$ is a radio signal strength value of a radio signal that is sent by to the $k^{th}$ common node and that is received by the to-be-localized node, $p_{ki}$ is a radio signal strength value of the radio signal that is sent by the $k^{th}$ common node and that is received by the $i^{th}$ known-location node, $a_i$ is a weighting coefficient corresponding to the $i^{th}$ known-location node, N is a quantity of common nodes, M is a quantity of known-location nodes, $g_{min}(a_1, a_2, a_3, \ldots, a_M)$ represents a value when $P_k$ most closely approximates $$\sum_{i=1}^{M} a_i * p_{ki},$$

where k=1, 2, ..., N, and λ is a Lagrange coefficient.

It should be noted that $$g_{min}(a_1, a_2, \ldots, a_M) = \sum_{k=1}^{N}\left(P_k - \sum_{i=1}^{M} a_i * P_{ki}\right)^2 + \lambda\left(\sum_{i=1}^{M} a_i - 1\right)$$

is constructed based on a minimum mean square error criterion and the method of Lagrange multipliers.

Method 4: The radio signal measurement value is a subchannel frequency domain response amplitude squared value in channel state information CSI; and the determined weighting coefficient corresponding to each known-location node meets a requirement of the following formula:

$$\begin{cases} \sum_{i=1}^{M} a_i = 1 \\ w_{min}(a_1, a_2, a_3, \ldots, a_M) = \sum_{h=1}^{C}\sum_{k=1}^{N}\left(P_{kh} - \sum_{i=1}^{M} a_i * p_{ki,h}\right)^2 \end{cases},$$

where $P_1$ is the $h^{th}$ subchannel frequency domain response amplitude squared value between the to-be-localized node and the $k^{th}$ common node, $p_{ki,h}$ is the $h^{th}$ subchannel frequency domain response amplitude squared value between the $i^{th}$ known-location node and the $k^{th}$ common node, $a_i$ is a weighting coefficient corresponding to the $i^{th}$ known-location node, N is a quantity of common nodes, M is a quantity of known-location nodes, c is a quantity of common subchannels between the to-be-localized node and the $k^{th}$ common node and between the $i^{th}$ known-location node and the $k^{th}$ common node, and $w_{min}(a_1, a_2, a_3, \ldots, a_M)$ represents a value when $P_{kh}$ most closely approximates $$\sum_{i=1}^{M} a_i * p_{ki,h}.$$

It should be noted that $$w_{min}(a_1, a_2, a_3, \ldots, a_M) = \sum_{h=1}^{C}\sum_{k=1}^{N}\left(P_{kh} - \sum_{i=1}^{M} a_i * p_{ki,h}\right)^2$$

is constructed according to a minimum mean square error criterion.

Method 5: The radio signal measurement value is a subchannel frequency domain response amplitude squared value in channel state information CSI; and the determined weighting coefficient corresponding to each known-location node meets a requirement of the following formula:

$$\begin{cases} \sum_{i=1}^{M} a_i = 1 \\ v_{min}(a_1, a_2, \ldots, a_M) = \sum_{h=1}^{C}\sum_{k=1}^{N}\left(P_{kh} - \sum_{i=1}^{M} a_i * P_{ki,h}\right)^2 + \lambda\left(\sum_{i=1}^{M} a_i - 1\right) \end{cases},$$

where $P_{kh}$ is the $h^{th}$ subchannel frequency domain response amplitude squared value between the to-be-localized node and the $k^{th}$ common node, $p_{ki,h}$ is the $h^{th}$ subchannel frequency domain response amplitude squared value between the $i^{th}$ known-location node and the $k^{th}$ common node, $a_i$ is a weighting coefficient corresponding to the $i^{th}$ known-location node, N is a quantity of common nodes, M is a quantity of known-location nodes, c is a quantity of common subchannels between the to-be-localized node and the $k^{th}$ common node and between the $i^{th}$ known-location node and the $k^{th}$ common node, $v_{min}(a_1, a_2, a_3, \ldots, a_M)$ represents a value when $P_{kh}$ most closely approximates $$\sum_{i=1}^{M} a_i * p_{ki,h},$$

and λ is a Lagrange coefficient.

It should be noted that $$v_{min}(a_1, a_2, \ldots, a_M) = \sum_{h=1}^{C}\sum_{k=1}^{N}\left(P_{kh} - \sum_{i=1}^{M} a_i * P_{ki,h}\right)^2 + \lambda\left(\sum_{i=1}^{M} a_i - 1\right)$$

is constructed based on a minimum mean square error criterion and the method of Lagrange multipliers.

Optionally, the determined location information of the to-be-localized node meets a requirement of the following formula:

$$(x, y, z) = \sum_{i=1}^{N} a_i(x_i, y_i, z_i),$$

where (x,y,z) is coordinate location information of the to-be-localized node, $(x_i, y_i, z_i)$ is coordinate location information of the $i^{th}$ known-location node, and $a_i$ is the weighting coefficient corresponding to the $i^{th}$ known-location node.

Figure 4:
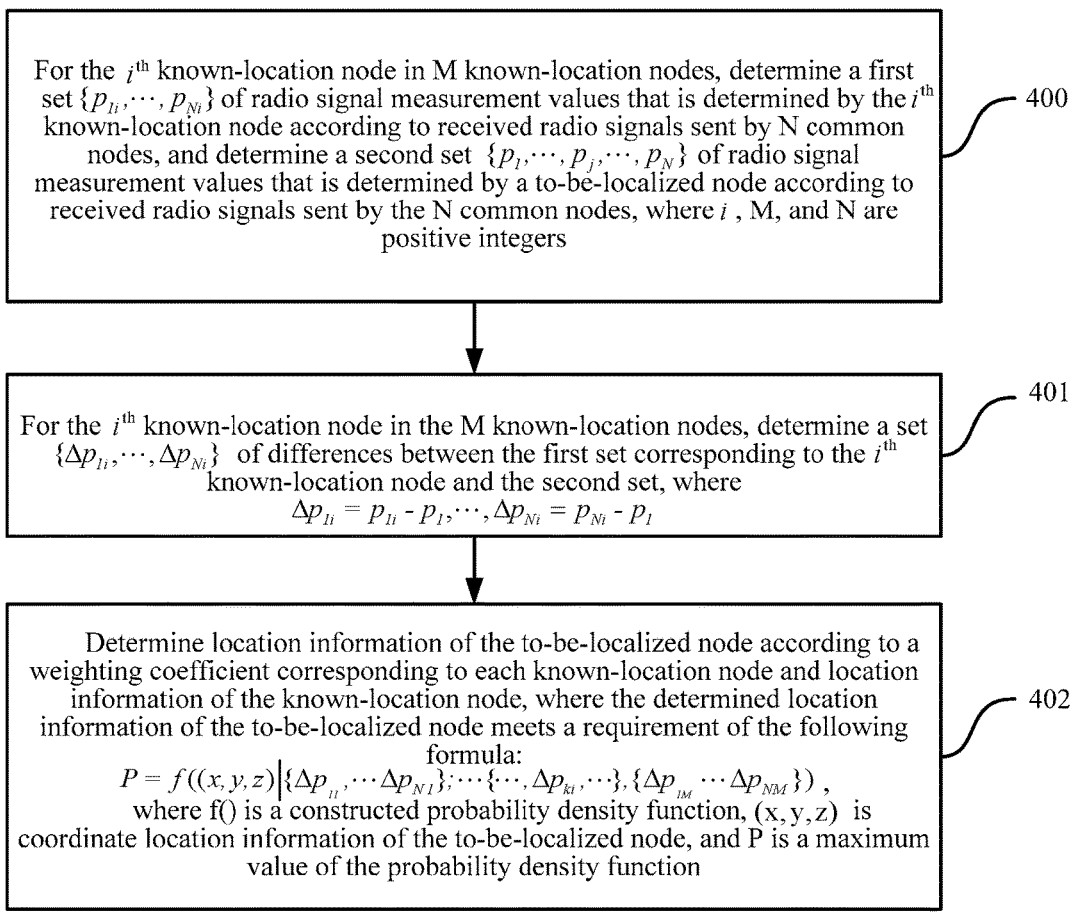
FIG. 4 is a flowchart of a node localization method according to an embodiment of the present invention.

As shown in FIG. 4, a node localization method of an embodiment of the present invention includes the following steps.

Step 400. For the $i^{th}$ known-location node in M known-location nodes, determine a first set $\{p_{1i}, \ldots, p_{Ni}\}$ of radio signal measurement values that is determined by the $i^{th}$ known-location node according to received radio signals sent by N common nodes, and determine a second set $\{p_1, \ldots, p_j, \ldots, p_N\}$ of radio signal measurement values that is determined by a to-be-localized node according to received radio signals sent by the N common nodes, where i, M, and N are positive integers.

Step 401. For the $i^{th}$ known-location node in the M known-location nodes, determine a set $\{\Delta p_{1i}, \ldots, \Delta p_{Ni}\}$ of differences between the first set $\{p_{1i}, \ldots, p_{Ni}\}$ corresponding to the $i^{th}$ known-location node and the second set $\{p_1, \ldots, p_N\}$, where $\Delta p_{1i}, p_{1i}-p_1, \ldots, \Delta p_{Ni}=p_{Ni}-p_1$.

Step 402. Determine, in preset localization space, location information of the to-be-localized node according to M determined difference sets, where the determined location information of the to-be-localized node meets a requirement of the following formula:

$$P=f((x,y,z)|\{\Delta p_{11}, \ldots \Delta p_{N1}\}; \ldots \{\ldots, \Delta p_{ki}, \ldots\}, \{\Delta p_{1M} \ldots \Delta p_{NM}\}),$$

where f( ) is a constructed joint probability density function, (x,y,z) is coordinate location information of the to-be-localized node, and P is a maximum value of the probability density function.

It should be noted that when the radio signal measurement value is a radio signal strength value, f( ) is constructed according to a large-scale model of a radio signal.

Specifically, f( ) is constructed according to a large-scale model of a radio signal, where the large-scale model of the radio signal is:

$$P=P_0-10n*lg(d/d_0)+X,$$

where $P_0$ is received signal strength when a distance is $d_0$, n is a large-scale channel fading index, d is a distance between a receiving device and a signal source, and X is a random variable. Because a received signal is usually changeable, the received signal may be indicated by using a Gaussian random variable. An average value of X is 0, and a mean square error of X is σ. According to many existing measurement results, n mostly ranges from 1.5 to 4, and σ mostly ranges from 3 to 15.

A to-be-localized node U receives a radio signal measurement value $P_k$ of a radio signal sent by the $k^{th}$ common node, and the $i^{th}$ known-location node receives a radio signal measurement value $P_{ki}$ of a radio signal sent by the $K^{th}$ common node. In this case, $$\Delta p_{ki}=P_{ki}-p_k=10n*lg(d_k/d_{ik})+X_k-X_{ki}.$$

Therefore, determining of a location of the to-be-localized node may be converted to determining, in preset localization space when a difference between radio signal measurement values of radio signals of a same common node that are received by a known-location node and a to-be-localized node is a difference that is obtained through actual measurement and that is between radio signal measurement values of radio signals of a same common node that are received by a known-location node and a to-be-localized node, that a location when a conditional joint probability density function of the location has a maximum value is the location of the to-be-localized node.

It should be noted that radio signals sent by common nodes are independent of each other, and radio signals received by the known-location node and the to-be-localized node are also independent of each other.

During calculation, when geographic information is unknown, it may be considered that probability density distribution of the location of the to-be-localized node is uniform distribution in the preset localization space.

In addition, a specific step of determining that $P=f((x,y,z)|\{\Delta p_{11}, \ldots \Delta p_{N1}\}; \ldots \{\ldots, \Delta p_{ki}, \ldots\}, \{\Delta p_{1M}, \ldots \Delta p_{NM}\})$ is as follows:

Because $$P = f((x, y, z)|\{\Delta p_{11}, \ldots \Delta p_{N1}\}; \ldots \{\ldots, \Delta p_{ki}, \ldots\}, \{\Delta p_{1M}, \ldots \Delta p_{NM}\}) =$$

$$f(\{\Delta p_{11}, \ldots \Delta p_{N1}\}; \ldots \{\ldots, \Delta p_{ki}, \ldots\}, \{\Delta p_{1M}, \ldots \Delta p_{NM}\}|(x, y, z)) *$$

$$g(x, y, z) \bigg/ \iiint_\eta f(\{\Delta p_{11}, \ldots \Delta p_{N1}\}; \ldots \{\ldots, \Delta p_{ki}, \ldots\},$$

$$\{\Delta p_{1M}, \ldots \Delta p_{NM}\}|(x, y, z)) * g(u, v, w) du dv dw,$$

where η is the preset localization space, and g(x,y,z) is probability density of a possible location of the to-be-localized node in the preset localization space, by determining:

$$f(\{\Delta p_{11}, \ldots \Delta p_{N1}\}; \ldots \{\ldots, \Delta p_{ki}, \ldots\}, \{\Delta p_{1M} \ldots \Delta p_{NM}\}|(x,y,z))*g(x,y,z)$$

a joint probability density function may be constructed.

Specifically, it is obtained according to independence of the radio signals sent by the common nodes and independence of the radio signals received by the known-location node and the to-be-localized node that:

$$f(\{\Delta p_{11}, \ldots \Delta p_{N1}\}; \ldots \{\ldots, \Delta p_{ki}, \ldots\}, \{\Delta p_{1M}, \ldots \Delta p_{NM}\}|(x, y, z)) *$$

$$g(x, y, z) = \prod_{k=1}^{N} f\{\Delta P_{k1}, \ldots \Delta P_{kM} | (x, y, z)\} * g(x, y, z) =$$

$$\prod_{k=1}^{N} \prod_{i=1}^{M} f\{\Delta P_{ki} | (x, y, z)\} * g(x, y, z) =$$

$$\prod_{k=1}^{N} \prod_{i=1}^{M} \left[ \iiint_\eta f\{\Delta P_{ki} | (x, y, z), (u_k, v_k, w_k)\} * \right.$$

$$\left. g(u_k, v_k, w_k) du_k dv_k dw_k \right] * g(x, y, z),$$

where $(u_k, v_k, w_k)$ is coordinates of the $k^{th}$ common node, and if the common node is the known-location node, location coordinates are known. Therefore, $$\iiint_\eta f\{\Delta P_{ki} | (x, y, z), (u_k, v_k, w_k)\} * g(u_k, v_k, w_k) du_k dv_k dw_k =$$

$$f\{\Delta P_{ki} | (x, y, z)\},$$

and $f\{\Delta P_{ki}|(x,y,z)\}$ may be obtained by using the large-scale model of the radio signal.

In addition, if the common node is a node whose location coordinates are unknown, integration is performed on a product of location probability density distribution and received signal strength difference probability density distribution that corresponds to all possible locations, to obtain a probability density distribution function of a possible location of the to-be-localized node when a difference between radio signal measurement values that are determined according to the radio signals that are sent by the common node and that are received by the known-location node and the to-be-localized node is an actually determined difference, and location information of the node does not need to be determined.

Based on a same inventive concept, an embodiment of the present invention further provides a node localization device. Because a method corresponding to the node localization device in this embodiment of the present invention is a node localization method, for an implementation of the device of the present invention, refer to an implementation of the method. No repeated description is provided.

Figure 5:
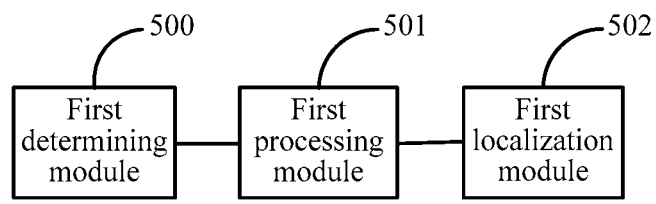
FIG. 5 is a schematic diagram of a node localization device according to an embodiment of the present invention.

As shown in FIG. 5, the node localization device of this embodiment of the present invention includes:

a first determining module 500, configured to: determine a first set of radio signal measurement values that can be received by each known-location node of at least one known-location node, and determine a second set of radio signal measurement values that can be received by a to-be-localized node, where the radio signal measurement values included in the first set that are received by each known-location node and the radio signal measurement values included in the second set are respectively determined according to a radio signal sent by at least one common node;

a first processing module 501, configured to determine, according to the radio signal measurement values included in the first set that respectively correspond to each known-location node and the radio signal measurement values included in the second set, a weighting coefficient corresponding to each known-location node; and a first localization module 502, configured to determine location information of the to-be-localized node according to the weighting coefficient corresponding to each known-location node and location information of each known-location node.

Optionally, the radio signal measurement value is a radio signal strength value, and the first processing module 501 is specifically configured to:

determine that the weighting coefficient corresponding to each known-location node meets a requirement of the following formula:

$$a_i = \frac{\sum_{k=1}^{N} 10^{-\frac{|P_{ki}-P_k|}{10n_i}}}{\sum_{i=1}^{M}\sum_{k=1}^{N} 10^{-\frac{|P_{ki}-P_k|}{10n_i}}},$$

where $P_k$ is a radio signal strength value of a radio signal that is sent by the $k^{th}$ common node and that is received by the to-be-localized node, $p_{ki}$ is a radio signal strength value of the radio signal that is sent by the $k^{th}$ common node and that is received by the $i^{th}$ known-location node, $a_i$ is a weighting coefficient corresponding to the $i^{th}$ known-location node, N is a quantity of common nodes, M is a quantity of known-location nodes, and $n_i$ is a large-scale channel fading index corresponding to the $i^{th}$ known-location node.

Optionally, a result that is obtained by the first processing module 501 by performing, by using the weighting coefficient corresponding to each known-location node, weighted summation on the radio signal measurement values that are included in the first set corresponding to each known-location node and that are determined according to a radio signal sent by a same node approximates the radio signal measurement values that are included in the second set and that are determined according to the radio signal sent by the same node.

Optionally, the radio signal measurement value is a radio signal strength value, and the first processing module 501 is specifically configured to:

determine that the weighting coefficient corresponding to each known-location node meets a requirement of the following formula:

$$\begin{cases} \sum_{i=1}^{M} a_i = 1 \\ f_{min}(a_1, a_2, a_3, \ldots, a_M) = \sum_{k=1}^{N}\left(P_k - \sum_{i=1}^{M} a_i * p_{ki}\right)^2 \end{cases},$$

where $P_k$ is a radio signal strength value of a radio signal that is sent by the $k^{th}$ common node and that is received by the to-be-localized node, $p_{ki}$ is a radio signal strength value of the radio signal that is sent by the $k^{th}$ common node and that is received by the $i^{th}$ known-location node, $a_i$ is a weighting coefficient corresponding to the $i^{th}$ known-location node, N is a quantity of common nodes, M is a quantity of known-location nodes, and $f_{min}(a_1, a_2, a_3, \ldots, a_M)$ represents a value when p most closely approximates $$\sum_{i=1}^{M} a_i * p_{ki},$$

where k=1, 2, . . . , N.

Optionally, the radio signal measurement value is a radio signal strength value, and the first processing module 501 is specifically configured to:

determine that the weighting coefficient corresponding to each known-location node meets a requirement of the following formula:

$$\begin{cases} \sum_{i=1}^{M} a_i = 1 \\ g_{min}(a_1, a_2, \ldots, a_M) = \sum_{k=1}^{N}\left(P_k - \sum_{i=1}^{M} a_i * P_{ki}\right)^2 + \lambda\left(\sum_{i=1}^{M} a_i - 1\right) \end{cases},$$

where $P_k$ is a radio signal strength value of a radio signal that is sent by the $k^{th}$ common node and that is received by the to-be-localized node, $p_{ki}$ is a radio signal strength value of the radio signal that is sent by the $k^{th}$ common node and that is received by the $i^{th}$ known-location node, is a weighting coefficient corresponding to the $i^{th}$ known-location node, N is a quantity of common nodes, M is a quantity of known-location nodes, $g_{min}(a_1, a_2, a_3, \ldots, a_M)$ represents a value when $P_k$ most closely approximates $$\sum_{i=1}^{M} a_i * P_{ki},$$

where k=1, 2, . . . , N, and $\lambda$ is a Lagrange coefficient.

Optionally, the radio signal measurement value is a sub-channel frequency domain response amplitude squared value in channel state information CSI, and the first processing module 501 is specifically configured to:

determine that the weighting coefficient corresponding to each known-location node meets a requirement of the following formula:

$$\begin{cases} \sum_{i=1}^{M} a_i = 1 \\ w_{min}(a_1, a_2, a_3, \ldots, a_M) = \sum_{h=1}^{C} \sum_{k=1}^{N} \left( P_k - \sum_{i=1}^{M} a_i * p_{ki,h} \right)^2 \end{cases},$$

where $P_{kh}$ is the $h^{th}$ subchannel frequency domain response amplitude squared value between the to-be-localized node and the $k^{th}$ common node, $p_{ki,h}$ is the $h^{th}$ subchannel frequency domain response amplitude squared value between the $i^{th}$ known-location node and the $k^{th}$ common node, $a_i$ is a weighting coefficient corresponding to the $i^{th}$ known-location node, N is a quantity of common nodes, M is a quantity of known-location nodes, c is a quantity of common subchannels between the to-be-localized node and the $k^{th}$ common node and between the $i^{th}$ known-location node and the $k^{th}$ common node, and $w_{min}(a_1, a_2, a_3, \ldots, a_M)$ represents a value when $P_{kh}$ most closely approximates $$\sum_{i=1}^{M} a_i * p_{ki,h}.$$

Optionally, the radio signal measurement value is a subchannel frequency domain response amplitude squared value in channel state information CSI, and the first processing module 501 is specifically configured to:

determine that the weighting coefficient corresponding to each known-location node meets a requirement of the following formula:

$$\begin{cases} \sum_{i=1}^{M} a_i = 1 \\ v_{min}(a_1, a_2, \ldots, a_M) = \sum_{h=1}^{C} \sum_{k=1}^{N} \left( P_{kh} - \sum_{i=1}^{M} a_i * p_{ki,h} \right)^2 + \lambda \left( \sum_{i=1}^{M} a_i - 1 \right) \end{cases},$$

where $P_{kh}$ is the $h^{th}$ subchannel frequency domain response amplitude squared value between the to-be-localized node and the $k^{th}$ common node, $p_{ki,h}$ is the $h^{th}$ subchannel frequency domain response amplitude squared value between the $i^{th}$ known-location node and the $k^{th}$ common node, $a_i$ is a weighting coefficient corresponding to the $i^{th}$ known-location node, N is a quantity of common nodes, M is a quantity of known-location nodes, c is a quantity of common subchannels between the to-be-localized node and the $k^{th}$ common node and between the $i^{th}$ known-location node and the $k^{th}$ common node, $v_{min}(a_1, a_2, a_3, \ldots, a_M)$ represents a value when $P_{kh}$ most closely approximates $$\sum_{i=1}^{M} a_i * p_{ki,h},$$

and $\lambda$ is a Lagrange coefficient.

Optionally, the location information of the to-be-localized node that is determined by the first localization module 502 meets a requirement of the following formula:

$$(x, y, z) = \sum_{i=1}^{N} a_i(x_i, y_i, z_i),$$

where (x,y,z) is coordinate location information of the to-be-localized node, $(x_i, y_i, z_1)$ is coordinate location information of the $i^{th}$ known-location node, and $a_i$ is the weighting coefficient corresponding to the $i^{th}$ known-location node.

Figure 6:
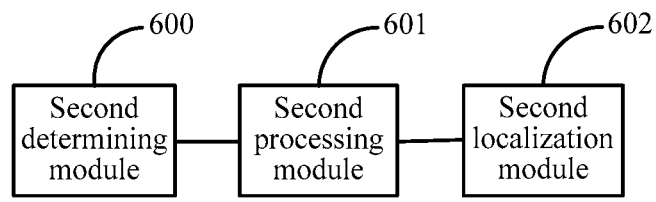
FIG. 6 is a schematic diagram of a node localization device according to an embodiment of the present invention.

As shown in FIG. 6, a node localization device of an embodiment of the present invention includes:

a second determining module 600, configured to: for the $i^{th}$ known-location node in M known-location nodes, determine a first set $\{p_{1i}, \ldots, p_{Ni}\}$ of radio signal measurement values that is determined by the $i^{th}$ known-location node according to received radio signals sent by N common nodes, and determine a second set $\{p_1, \ldots, p_j, \ldots, p_N\}$ of radio signal measurement values that is determined by a to-be-localized node according to received radio signals sent by the N common nodes, where i, M, and N are positive integers;

a second processing module 601, configured to: for the $i^{th}$ known-location node in the M known-location nodes, determine a set $\{\Delta p_{1i}, \ldots, \Delta p_{Ni}\}$ of differences between the first set $\{p_{1i}, \ldots, p_{Ni}\}$ corresponding to the $i^{th}$ known-location node and the second set $\{p_1, \ldots, p_N\}$, where $\Delta p_{1i} = p_{1i} - p_1, \ldots, \Delta p_{Ni} = p_{Ni} - p_1$; and a second localization module 602, configured to determine, in preset localization space, location information of the to-be-localized node according to M determined difference sets, where the determined location information of the to-be-localized node meets a requirement of the following formula:

$$P = f(x,y,z)/\{\Delta p_{11}, \ldots \Delta p_{N1}\}; \ldots \{\ldots, \Delta p_{ki}, \ldots\}, \{\Delta p_{1M} \ldots \Delta p_{NM}\})$$

where f( ) is a constructed joint probability density function, (x,y,z) is coordinate location information of the to-be-localized node, and P is a maximum value of the probability density function.

It should be noted that division of the modules in the devices shown in FIG. 5 and FIG. 6 is merely an example, and is merely logical function division. There may be other division during actual implementation. In addition, the functional modules in the embodiments of this application may be integrated into one processing unit, or each of the modules may exist alone physically, or two or more modules may be integrated into one unit. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) or a processor (processor) to perform all or a part of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

Figure 7:
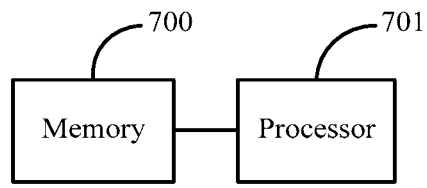
FIG. 7 is a schematic diagram of a node localization device according to an embodiment of the present invention.

As shown in FIG. 7, a hardware structure implementation form of a node localization device in the embodiments of the present invention includes:
  a memory 700, configured to store a program for implementing node localization and required data; and
  a processor 701, configured to execute a related program by invoking related data, to implement a technical solution provided in the embodiments of the present invention.

It can be learned from the foregoing content that in the embodiments of the present invention, the first set of the radio signal measurement values that can be received by each known-location node of the at least one known-location node is determined, and the second set of the radio signal measurement values that can be received by the to-be-localized node is determined, where the radio signal measurement values included in the first set that are received by each known-location node and the radio signal measurement values included in the second set are respectively determined according to the radio signal sent by the at least one common node, the weighting coefficient corresponding to each known-location node is determined according to the radio signal measurement values included in the first set that respectively correspond to each known-location node and the radio signal measurement values included in the second set, and the location information of the to-be-localized node is determined according to the weighting coefficient corresponding to each known-location node and the location information of each known-location node. In such a technical solution, because the location of the to-be-localized node is determined according to the weighting coefficient corresponding to each known-location node, without a need to measure a status of radio signals that are received by a large quantity of known-location nodes and that are sent by other nodes. Therefore, this technical solution improves measurement efficiency and accuracy of localizing a to-be-localized node compared with a method in the prior art for determining a location of a to-be-localized node.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, a person skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A node localization method, comprising:
  storing information regarding one or more radio signals received by at least one known-location node, wherein the information indicates a location of the at least one known-location node;
  storing information regarding one or more radio signals received by a to-be-positioned node, wherein the one or more radio signals received by the at least one known-location node and the one or more radio signals received by the to-be-positioned node include radio signals transmitted by at least one common node such that the at least one common node transmits the radio signals to both the at least one known-location node and the to-be positioned node;
  determining a first set of measurement values for the one or more radio signals received by at least one known-location node;
  determining a second set of measurement values for the one or more radio signals received by a to-be-positioned node;
  determining correspondences between the measurement values in the first set and in the second set such that a measurement value for a first given radio signal in the first set is determined to correspond to a measurement value for a second given radio signal in the second set by virtue of the first given radio signal and the second given radio signal are transmitted by the at least one common node;

determining, based on the measurement values in the first set and in the second set, according to the correspondences between the radio signal measurement values in the first set and in the second set, a weighting coefficient corresponding to each of the at least one known-location node; and determining location information of the to-be-positioned node according to the weighting coefficient corresponding to each of the known-location node and the location of the each of the at least one known-location node; and, wherein the method further comprises:

performing, by using the weighting coefficient corresponding to each of the at least one known-location node, according to a radio signal sent by the at least one common node, weighted summation on the radio signal measurement values in the first set corresponding to each of the at least one known-location node, wherein a result of the weighted summation approximates the radio signal measurement values that are comprised in the second set and that are determined according to the radio signal sent by the at least one common node.

2. The method according to claim 1, wherein measurement value for the first given radio signal is a radio signal strength value; and the determined weighting coefficient corresponding to each of the at least one known-location node meets a requirement of the following formula:

$$a_i = \frac{\sum_{k=1}^{N} 10^{-\frac{|P_{ki}-P_k|}{10n_i}}}{\sum_{i=1}^{M}\sum_{k=1}^{N} 10^{-\frac{|P_{ki}-P_k|}{10n_i}}},$$

wherein $P_k$ is a radio signal strength value of a radio signal that is sent by the $k^{th}$ common node and that is received by the to-be-positioned node, $p_{ki}$ is a radio signal strength value of the radio signal that is sent by the $k^{th}$ common node and that is received by the $i^{th}$ known-location node, $a_i$ is a weighting coefficient corresponding to the $i^{th}$ known-location node, N is a quantity of common nodes, M is a quantity of known-location nodes, and $n_i$ is a large-scale channel fading index corresponding to the $i^{th}$ known-location node.

3. The method according to claim 1, wherein measurement value for the first given radio signal is a radio signal strength value; and the determined weighting coefficient corresponding to each of the at least one known-location node meets a requirement of the following formula:

$$\begin{cases} \sum_{i=1}^{M} a_i = 1 \\ f_{min}(a_1, a_2, a_3, \ldots, a_M) = \sum_{k=1}^{N}\left(P_k - \sum_{i=1}^{M} a_i * p_{ki}\right)^2 \end{cases},$$

wherein $P_k$ is a radio signal strength value of a radio signal that is sent by the $k^{th}$ common node and that is received by the to-be-positioned node, $p_{ki}$ is a radio signal strength value of the radio signal that is sent by the $k^{th}$ common node and that is received by the $i^{th}$ known-location node, $a_i$ is a weighting coefficient corresponding to the $i^{th}$ known-location node, N is a quantity of common nodes, M is a quantity of known-location nodes, and $f_{min}(a_1, a_2, a_3, \ldots, a_k)$ represents a value when $P_k$ most closely approximates $$\sum_{i=1}^{M} a_i * p_{ki},$$

wherein k=1, 2, . . . , N.

4. The method according to claim 1, wherein measurement value for the first given radio signal is a radio signal strength value; and the determined weighting coefficient corresponding to each of the at least one known-location node meets a requirement of the following formula:

$$\begin{cases} \sum_{i=1}^{M} a_i = 1 \\ g_{min}(a_1, a_2, \ldots, a_M) = \sum_{k=1}^{N}\left(P_k - \sum_{i=1}^{M} a_i * P_{ki}\right)^2 + \lambda\left(\sum_{i=1}^{M} a_i - 1\right) \end{cases},$$

wherein $P_k$ is a radio signal strength value of a radio signal that is sent by the $k^{th}$ common node and that is received by the to-be-localized node, $p_{ki}$ is a radio signal strength value of the radio signal that is sent by the $k^{th}$ common node and that is received by the $i^{th}$ known-location node, $a_i$ is a weighting coefficient corresponding to the $i^{th}$ known-location node, N is a quantity of common nodes, M is a quantity of known-location nodes, $g_{min}(a_1, a_2, a_3, \ldots, a_M)$ represents a value when $P_k$ most closely approximates $$\sum_{i=1}^{M} a_i * p_{ki},$$

wherein k=1, 2, . . . , N, and $\lambda$ is a Lagrange coefficient.

5. The method according to claim 1, wherein the measurement value for the first given radio signal is a subchannel frequency domain response amplitude squared value in channel state information (CSI); and the determined weighting coefficient corresponding to each known-location node meets a requirement of the following formula:

$$\begin{cases} \sum_{i=1}^{M} a_i = 1 \\ w_{min}(a_1, a_2, a_3, \ldots, a_M) = \sum_{h=1}^{C}\sum_{k=1}^{N}\left(P_k - \sum_{i=1}^{M} a_i * p_{ki,h}\right)^2 \end{cases},$$

wherein $P_{k,h}$ is the $h^{th}$ subchannel frequency domain response amplitude squared value between the to-be-localized node and the $k^{th}$ common node, $p_{ki,h}$ is the $h^{th}$ subchannel frequency domain response amplitude squared value between the $i^{th}$ known-location node and the $k^{th}$ common node, $a_i$ is a weighting coefficient corresponding to the $i^{th}$ known-location node, N is a quantity of common nodes, M is a quantity of known-location nodes, c is a quantity of common subchannels between the to-be-localized node and the $k^{th}$ common node and between the $i^{th}$ known-location node and the $k^{th}$ common node, and $w_{min}(a_1, a_2, a_3, \ldots, a_M)$ represents a value when $P_{kh}$ most closely approximates $$\sum_{i=1}^{M} a_i * p_{ki,h}.$$

6. The method according to claim 1, wherein the measurement value for the first given radio signal is a subchannel frequency domain response amplitude squared value in channel state information (CSI); and the determined weighting coefficient corresponding to each known-location node meets a requirement of the following formula:

$$\begin{cases} \sum_{i=1}^{M} a_i = 1 \\ v_{min}(a_1, a_2, \ldots, a_M) = \sum_{h=1}^{C}\sum_{k=1}^{N}\left(P_{kh} - \sum_{i=1}^{M} a_i * P_{ki,h}\right)^2 + \lambda\left(\sum_{i=1}^{M} a_i - 1\right) \end{cases},$$

wherein $P_{kh}$ is the $h^{th}$ subchannel frequency domain response amplitude squared value between the to-be-localized node and the $k^{th}$ common node, $p_{ki,h}$ is the $h^{th}$ subchannel frequency domain response amplitude squared value between the $i^{th}$ known-location node and the $k^{th}$ common node, $a_i$ is a weighting coefficient corresponding to the $i^{th}$ known-location node, N is a quantity of common nodes, M is a quantity of known-location nodes, c is a quantity of common subchannels between the to-be-localized node and the $k^{th}$ common node and between the $i^{th}$ known-location node and the $k^{th}$ common node, $v_{min}(a_1, a_2, a_3, \ldots, a_M)$ represents a value when $P_{kh}$ most closely approximates $$\sum_{i=1}^{M} a_i * p_{ki,h},$$

and $\lambda$ is a Lagrange coefficient.

7. The method according to claim 1, wherein the determined location information of the to-be-localized node meets a requirement of the following formula:

$$(x, y, z) = \sum_{i=1}^{N} a_i(x_i, y_i, z_i),$$

wherein (x, y, z) is coordinate location information of the to-be-localized node, $(x_i, y_i, z_i)$ is coordinate location information of the $i^{th}$ known-location node, and $a_i$ is the weighting coefficient corresponding to the $i^{th}$ known-location node.

8. A node positioning method, comprising:
storing information regarding one or more radio signals received by M known-location nodes, wherein the information indicates locations of the M known-location nodes;
storing information regarding one or more radio signals received by a to-be-positioned node, wherein the one or more radio signals received by the M known-location nodes and the one or more radio signals received by the to-be-positioned node include radio signals transmitted by N common nodes such that the N common nodes transmit the radio signals to both the M known-location nodes and the to-be positioned node, and wherein M, and N are positive integers;
determining a first set $\{p_{1i}, \ldots, p_{Ni}\}$ of radio signal measurement values for an $i^{th}$ known-location node in the in M known-location nodes according to the radio signals sent by N common nodes to the $i^{th}$ known-location node, wherein i is a positive integer;
determining a second set $\{p_1, \ldots, p_j, \ldots, p_N\}$ of radio signal measurement values for the to-be-positioned node according to the radio signals sent by the N common nodes to the to-be-positioned node;
determining a set $\{\Delta p_{1i}, \ldots, \Delta p_{Ni}\}$ of differences between the first set $\{p_{1i}, \ldots, P_{Ni}\}$ corresponding to the $i^{th}$ known-location node and the second set $\{p_1, \ldots, p_N\}$, wherein $\Delta p_{1i} = p_{1i} - p_1, \ldots, \Delta p_{Ni} = p_{Ni} - p_1$; and
determining, in preset localization space, location information of the to-be-positioned node according to M determined difference sets, wherein the determined location information of the to-be-positioned node meets a requirement of the following formula:

$$P = f(x,y,z) | \{\Delta p_{11}, \ldots \Delta p_{N1}\}; \ldots \\ \{\ldots, \Delta p_{ki}, \ldots\}, \{\Delta p_{1m} \ldots \Delta p_{NM}\})$$

wherein f( ) is a constructed joint probability density function, (x, y, z) is coordinate location information of the to-be-localized node, and P is a maximum value of the probability density function.

9. A node positioning device comprising a processor configured to execute machine-readable instructions such that when the machine-readable instructions are executed the processor is caused to perform:
storing information regarding one or more radio signals received by at least one known-location node, wherein the information indicates a location of the at least one known-location node;
storing information regarding one or more radio signals received by a to-be-positioned node, wherein the one or more radio signals received by the at least one known-location node and the one or more radio signals received by the to-be-positioned node include radio signals transmitted by at least one common node such that the at least one common node transmits the radio signals to both the at least one known-location node and the to-be positioned node;
determining a first set of measurement values for the one or more radio signals received by at least one known-location node;
determining a second set of measurement values for the one or more radio signals received by a to-be-positioned node;
determining correspondences between the measurement values in the first set and in the second set such that a measurement value for a first given radio signal in the first set is determined to correspond to a signal measurement value for a second given radio signal in the second by virtue of the first given radio signal and the second given radio signal are transmitted by the at least one common node;

determining, based on the radio signal measurement values in the first set and in the second set, according to the correspondences between the radio signal measurement values in the first set and in the second set, a weighting coefficient corresponding to each of the at least one known-location node; and determining location information of the to-be-positioned node according to the weighting coefficient corresponding to each of the known-location node and the location of the each of the at least one known-location node; and, wherein the processor is further caused to perform: performing, by using the weighting coefficient corresponding to each of the at least one known-location node and according to a radio signal sent by the at least one common node, weighted summation on the radio signal measurement values in the first set corresponding to each of the at least one known-location node wherein a result of the weighted summation approximates the radio signal measurement values that are comprised in the second set and that are determined according to the radio signal sent by the at least one common node.

10. The device according to claim 9, wherein the measurement value for the first given radio signal is a radio signal strength value, and the processor is further caused to perform:

determining that the weighting coefficient corresponding to each of the at least one known-location node meets a requirement of the following formula:

$$a_i = \frac{\sum_{k=1}^{N} 10^{-\frac{|P_{ki}-P_k|}{10 n_i}}}{\sum_{i=1}^{M}\sum_{k=1}^{N} 10^{-\frac{|P_{ki}-P_k|}{10 n_i}}},$$

wherein $P_k$ is a radio signal strength value of a radio signal that is sent by the $k^{th}$ common node and that is received by the to-be-positioned node, $p_{ki}$ is a radio signal strength value of the radio signal that is sent by the $k^{th}$ common node and that is received by the $i^{th}$ known-location node, a is a weighting coefficient corresponding to the $i^{th}$ known-location node, N is a quantity of common nodes, M is a quantity of known-location nodes, and $n_i$ is a large-scale channel fading index corresponding to the $i^{th}$ known-location node.

11. The device according to claim 9, the measurement value for the first given radio signal is a radio signal strength value, and the first processing module is configured to:

determine that the weighting coefficient corresponding to each of the at least one known-location node meets a requirement of the following formula:

$$\begin{cases} \sum_{i=1}^{M} a_i = 1 \\ f_{min}(a_1, a_2, a_3, \ldots, a_M) = \sum_{k=1}^{N}\left(P_k - \sum_{i=1}^{M} a_i * p_{ki}\right)^2 \end{cases},$$

wherein $P_k$ is a radio signal strength value of a radio signal that is sent by the $k^{th}$ common node and that is received by the to-be-positioned node, $p_{ki}$ is a radio signal strength value of the radio signal that is sent by the $k^{th}$ common node and that is received by the $i^{th}$ known-location node, $a_i$ is a weighting coefficient corresponding to the $i^{th}$ known-location node, N is a quantity of common nodes, M is a quantity of known-location nodes, and $f_{min}(a_1, a_2, a_3, \ldots, a_M)$ represents a value when $P_k$ most closely approximates $$\sum_{i=1}^{M} a_i * p_{ki},$$

wherein k=1, 2, . . . , N.

12. The device according to claim 9, wherein the measurement value for the first given radio signal is a radio signal strength value, and the first processing module is specifically configured to:

determine that the weighting coefficient corresponding to each of the at least one known-location node meets a requirement of the following formula:

$$\begin{cases} \sum_{i=1}^{M} a_i = 1 \\ g_{min}(a_1, a_2, \ldots, a_M) = \sum_{k=1}^{N}\left(P_k - \sum_{i=1}^{M} a_i * P_{ki}\right)^2 + \lambda\left(\sum_{i=1}^{M} a_i - 1\right)^2 \end{cases},$$

wherein $P_k$ is a radio signal strength value of a radio signal that is sent by the $k^{th}$ common node and that is received by the to-be-positioned node, $p_{ki}$ is a radio signal strength value of the radio signal that is sent by the $k^{th}$ common node and that is received by the $i^{th}$ known-location node, $a_i$ is a weighting coefficient corresponding to the $i^{th}$ known-location node, N is a quantity of common nodes, M is a quantity of known-location nodes, $g_{min}(a_1, a_2, a_3, \ldots, a_M)$ represents a value when $P_k$ most closely approximates $$\sum_{i=1}^{M} a_i * p_{ki},$$

wherein k=1, 2, . . . , N, and λ is a Lagrange coefficient.

13. The device according to claim 9, wherein the measurement value for the first given radio signal is a subchannel frequency domain response amplitude squared value in channel state information (CSI), and the processor is further caused to perform:

determining that the weighting coefficient corresponding to each of the at least one known-location node meets a requirement of the following formula:

$$\begin{cases} \sum_{i=1}^{M} a_i = 1 \\ w_{min}(a_1, a_2, a_3, \ldots, a_M) = \sum_{h=1}^{C}\sum_{k=1}^{N}\left(P_{kh} - \sum_{i=1}^{M} a_i * p_{ki,h}\right)^2 \end{cases},$$

wherein $P_{kh}$ is the $h^{th}$ subchannel frequency domain response amplitude squared value between the to-be-positioned node and the $k^{th}$ common node, $p_{ki,h}$ is the $h^{th}$ subchannel frequency domain response amplitude squared value between the $i^{th}$ known-location node and the $k^{th}$ common node, $a_i$ is a weighting coefficient corresponding to the $i^{th}$ known-location node, N is a quantity of common nodes, M is a quantity of known-location nodes, c is a quantity of common subchannels between the to-be-localized node and the $k^{th}$ common node and between the $i^{th}$ known-location node and the $k^{th}$ common node, and $w_{min}(a_1, a_2, a_3, \ldots, a_M)$ represents a value when $P_{kh}$ most closely approximates $$\sum_{i=1}^{M} a_i * p_{ki,h}.$$

14. The device according to claim 9, wherein the measurement value for the first given radio signal is a subchannel frequency domain response amplitude squared value in channel state information (CSI), and the processor is further caused to perform:
determining that the weighting coefficient corresponding to each of the at least one known-location node meets a requirement of the following formula:

$$\begin{cases} \sum_{i=1}^{M} a_i = 1 \\ v_{min}(a_1, a_2, \ldots, a_M) = \sum_{h=1}^{C} \sum_{k=1}^{N} \left( P_{kh} - \sum_{i=1}^{M} a_i * P_{ki,h} \right)^2 + \lambda \left( \sum_{i=1}^{M} a_i - 1 \right) \end{cases},$$

wherein $P_{kh}$ is the $h^{th}$ subchannel frequency domain response amplitude squared value between the to-be-positioned node and the $k^{th}$ common node, $p_{ki,h}$ is the $h^{th}$ subchannel frequency domain response amplitude squared value between the $i^{th}$ known-location node and the $k^{th}$ common node, $a_i$ is a weighting coefficient corresponding to the $i^{th}$ known-location node, N is a quantity of common nodes, M is a quantity of known-location nodes, c is a quantity of common subchannels between the to-be-localized node and the $k^{th}$ common node and between the $i^{th}$ known-location node and the $k^{th}$ common node, $v_{min}(a_1, a_2, a_3, \ldots, a_M)$ represents a value when $P_{kh}$ most closely approximates $$\sum_{i=1}^{M} a_i * p_{ki,h},$$

and $\lambda$ is a Lagrange coefficient.

15. The device according to claim 9, wherein the location information of the to-be-localized node meets a requirement of the following formula:

$$(x, y, z) = \sum_{i=1}^{N} a_i(x_i, y_i, z_i),$$

wherein (x, y, z) is coordinate location information of the to-be-positioned node, $(x_i, y_i, z_i)$ is coordinate location information of the $i^{th}$ known-location node, and $a_i$ is the weighting coefficient corresponding to the $i^{th}$ known-location node.

16. A node positioning device comprising a processor configured to execute machine-readable instructions such that when the machine-readable instructions are executed the processor is caused to perform:
storing information regarding one or more radio signals received by M known-location nodes, wherein the information indicates locations of the M known-location nodes;
storing information regarding one or more radio signals received by a to-be-positioned node, wherein the one or more radio signals received by the M known-location nodes and the one or more radio signals received by the to-be-positioned node include radio signals transmitted by N common nodes such that the N common nodes transmit the radio signals to both the M known-location nodes and the to-be positioned node, and wherein M, and N are positive integers;
determining a first set $\{p_{1i}, \ldots, p_{Ni}\}$ of measurement values for an $i^{th}$ known-location node in the in M known-location nodes according to the radio signals sent by N common nodes to the $i^{th}$ known-location node, wherein i is a positive integer;
determining a second set $\{p_1, \ldots, p_j, \ldots, p_N\}$ of measurement values for the to-be-positioned node according to the radio signals sent by the N common nodes to the to-be-positioned node;
determining a set $\{\Delta p_{1i}, \ldots, \Delta p_{Ni}\}$ of differences between the first set $\{p_{1i}, \ldots, p_{Ni}\}$ corresponding to the $i^{th}$ known-location node and the second set $\{p_1, \ldots, p_N\}$, wherein $\Delta p_{1i} = p_{1i} - p_1, \ldots, \Delta p_{Ni} = p_{Ni} - p_1$; and
a second localization module, configured to determine, in preset localization space, location information of the to-be-positioned node according to M determined difference sets, wherein the determined location information of the to-be-positioned node meets a requirement of the following formula:

$P=f((x,y,z)|\{\Delta p_{11}, \ldots \Delta p_{N1}\}; \ldots$
$\{\ldots, \Delta p_{ki}, \ldots\}, \{\Delta p_{1M}, \ldots \Delta p_{NM}\})$ wherein f( ) is a constructed joint probability density function, (x, y, z) is coordinate location information of the to-be-localized node, and P is a maximum value of the probability density function.

* * * * *